US009528558B2

(12) United States Patent
Sin

(10) Patent No.: US 9,528,558 B2
(45) Date of Patent: Dec. 27, 2016

(54) SYNCHRONIZER HUB FOR VEHICLES AND METHOD FOR MANUFACTURING THE SAME

(71) Applicant: Hyundai Motor Company, Seoul (KR)

(72) Inventor: Na Ra Sin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/474,631

(22) Filed: Sep. 2, 2014

(65) Prior Publication Data

US 2015/0167815 A1 Jun. 18, 2015

(30) Foreign Application Priority Data

Dec. 13, 2013 (KR) ........................ 10-2013-0155232

(51) Int. Cl.
| | |
|---|---|
| *F16D 23/06* | (2006.01) |
| *B22F 5/08* | (2006.01) |
| *B22F 7/06* | (2006.01) |
| *B22F 3/02* | (2006.01) |
| *C22C 38/22* | (2006.01) |
| *C22C 38/44* | (2006.01) |
| *C21D 9/32* | (2006.01) |
| *C22C 33/02* | (2006.01) |
| *C21D 1/42* | (2006.01) |
| *B22F 3/03* | (2006.01) |

(52) U.S. Cl.
CPC ............... *F16D 23/06* (2013.01); *B22F 3/02* (2013.01); *B22F 5/08* (2013.01); *B22F 7/06* (2013.01); *C21D 9/32* (2013.01); *C22C 33/0264* (2013.01); *C22C 38/22* (2013.01); *C22C 38/44* (2013.01); *B22F 2003/033* (2013.01); *B22F 2998/10* (2013.01); *B22F 2999/00* (2013.01); *C21D 1/42* (2013.01); *C21D 2211/002* (2013.01); *C21D 2211/008* (2013.01); *C21D 2211/009* (2013.01); *C21D 2221/00* (2013.01); *C21D 2251/00* (2013.01); *F16D 2023/0637* (2013.01); *F16D 2300/12* (2013.01); *Y02P 10/253* (2015.11)

(58) Field of Classification Search
CPC ............................................. F16D 2023/0637
See application file for complete search history.

(56) References Cited

U.S. PATENT DOCUMENTS

| 2,331,909 | A | * | 10/1943 | Hensel | ...................... | B21K 1/30 |
| | | | | | | 148/514 |
| 5,308,702 | A | * | 5/1994 | Furukimi | ............ | C22C 33/0207 |
| | | | | | | 428/403 |
| 2011/0315500 | A1* | | 12/2011 | Park | ........................ | F16D 23/06 |
| | | | | | | 192/53.341 |

FOREIGN PATENT DOCUMENTS

| DE | 101 38 358 A1 * | 2/2003 | ............. F16D 23/06 |
| JP | 61-088029 A * | 5/1986 | |

(Continued)

*Primary Examiner* — Richard Lorence
(74) *Attorney, Agent, or Firm* — Mintz Levin Cohn Ferris Glovsky and Popeo, P.C.; Peter F. Corless

(57) ABSTRACT

A synchronizer hub for vehicles and a method for manufacturing the same forms an inner spline and an outer spline of a transmission synchronizer hub for vehicles by using different materials.

The synchronizer hub may be manufactured by filling inner powders for forming the inner spline, molding the inner spline, filling outer powders for forming the outer spline, molding the outer spline, separating the double molded object obtained by integrally forming the inner spline and the outer spline from a mold, and performing sintering, post-processing, and high-frequency heating processes.

5 Claims, 4 Drawing Sheets

(56) References Cited

FOREIGN PATENT DOCUMENTS

| JP | 08-041503 A | 2/1996 |
| KR | 10-0217604 B1 | 6/1999 |
| KR | 10-2001-0054436 A | 7/2001 |
| KR | 10-2010-0005358 A | 1/2010 |
| KR | 10-2011-0117831 A | 10/2011 |

\* cited by examiner (a) FILLING OF INNER POWDERS (b) MOLDING OF INNER SPLINE BY FIRST PRESS (c) FILLING OF OUTER POWDERS (d) MOLDING OF OUTER SPLINE BY SECOND PRESS Ni-rich Austenite + Martensite Ni-rich Austenite + Martensite Pearlite + Bainite Martensite

SYNCHRONIZER HUB FOR VEHICLES AND METHOD FOR MANUFACTURING THE SAME

CROSS-REFERENCE TO RELATED APPLICATION

This application claims under 35 U.S.C. §119(a) the benefit of Korean Patent Application No. 10-2013-0155232 filed Dec. 13, 2013, the entire contents of which are incorporated herein by reference.

BACKGROUND (a) Technical Field

The present invention relates to a synchronizer hub for vehicles and a method for manufacturing the same, more particularly, a synchronizer hub which can reduce costs and improve mechanical properties by forming an inner spline and an outer spline of a transmission synchronizer hub for vehicles by using different materials.

(b) Description of the Related Art

In general, a vehicle includes a power transmission system that reduces power generated from an engine to transmit the power to the tires.

As illustrated in FIG. 1, a synchromesh mechanism of a manual transmission of the power transmission system includes a clutch hub 12 that is spline-connected to a shaft (not illustrated), a transmission gear 16 that is rotatably provided at the shaft, a sleeve 11 that is spline-connected to an outer circumference of the clutch hub 12, a clutch gear 16' that is formed at a cone of the transmission gear 16 to mesh with the sleeve 11, a synchronizer ring 14 connected to the cone of the transmission gear 16 to perform a clutch operation upon coming in contact with the cone along with movement of the sleeve 11, and keys 15 that are inserted into grooves 12' of the clutch hub 12 and are inserted into grooves of the synchronizer ring 14 along with the movement of the sleeve 11 while being pushed to an inner surface of the sleeve 11 by an extension force of a synchronizer spring (not illustrated). Accordingly, the sleeve meshes with the clutch gear of the transmission gear being rotated at a peripheral speed, and thus a rotational force of the transmission is transmitted to the shaft.

The synchronizer hub in the power transmission system serves to guide the sleeve so as to smoothly proceed during the transmission and to support the sleeve in a rotating direction.

Since the synchronizer hub has a complicated structure that includes a boss that causes friction with the clutch gear, a spline connection unit, an intermediate connection part, an outer spline part connected to the sleeve, the synchronizer hub is mostly made of a sintered material. Particularly, since sliding friction is caused between the boss and the clutch during the synchronization, a high-frequency heating process or an entire surface carburizing process is mostly performed on the boss in order to enhance wear resistance.

Unfortunately, a wear resistance process of the boss may result in an increased product cost. In recent years, as transmission torque is increased, when stiffness of the sintered material reaches a limit, the synchronizer hub may be damaged.

In order to solve the above-described problems, Korean Patent Application Publication No. 2010-5358 discloses a low-cost synchronizer hub having high strength by sintering and control-cooling a ferritic powder which is an alloy of chrome and molybdenum. However, the synchronizer hub having such a structure is not easily manufactured, and durability thereof is not satisfactory.

In addition, Korean Patent No. 10-217604 discloses a double structure of a synchronizer that is separately formed as a double structure of an internal insertion part made of a copper powder sintered material and an outer ring body made of a sintered alloy material, and in which the internal insertion part is integrally formed with the outer ring body by being forcibly inserted into the outer ring body. However, in this case, the number of components is increased. Further, in the synchronizer, since an outer ring is forcibly inserted, there is a higher possibility of product failure.

Meanwhile, as a technology that manufactures a body of one molded product by using different kinds of metals, Japanese Patent Application Publication No. 1996-41503 discloses a technology in which a first powder material is temporarily compacted to mold a first temporary compaction powder material, a second powder material is filled in a mold frame into which the first temporary compaction powder material is inserted, the second compact powder material is temporarily compacted to mold a second temporary compaction powder material, the first temporary compaction powder material and the second temporary compaction powder material are integrally pressed to mold a compaction powder molded object, and then the compaction powder molded object is sintered. Moreover, Korean Patent Application Publication No. 2011-117831 discloses a technology of forming a cutting tip using different materials by pressing hard metal powders to form a cutting tip, pressing soft metal powders to form a cutting block, and then press-molding the cutting tip and the cutting block to be combined with each other.

However, in the technology using different materials, it is difficult to select and to form a metal material depending on a function and kind of a molded product to which the technology is applied, and it is difficult to integrate different materials. In addition, it is difficult to maintain the molded product to have excellent mechanical properties, and particularly, it may be difficult to apply the technology due to a structural characteristic of a synchronizer hub for vehicles.

The above information disclosed in this Background section is only for enhancement of understanding of the background of the invention and therefore it may contain information that does not form the prior art that is already known in this country to a person of ordinary skill in the art.

SUMMARY

The present invention provides that when an inner spline and an outer spline of a transmission synchronizer hub for vehicles are double-molded by using different materials, it is possible to obtain the synchronizer hub capable of reducing cost with excellent mechanical properties.

An object of the present invention is to provide a synchronizer hub for vehicles obtained by double-molding an inner spline and an outer spline by using different materials.

Another object of the present invention is to provide a method for manufacturing a synchronizer hub for vehicles capable of reducing cost with excellent mechanical properties by forming an outer spline and an inner spline by using different materials through different double-molding processes.

In one aspect, the present invention provides a synchronizer hub for vehicles which is formed as a double molded object obtained by integrally forming an inner spline and an outer spline of a synchronizer hub by using different materials.

In another aspect, the present invention provides a method for manufacturing a synchronizer hub for vehicles including filling inner powders for forming an inner spline in a first space formed between a mold main body, a first mold positioned on an upper side, and a second mold positioned on a lower side; press-molding the inner powders in the second mold by using a first press to form the inner spline; moving the first mold to the lower side, and filling outer powders for forming an outer spline in a second space formed between the mold main body, the first mold, and the molded inner spline; rotating an upper part of a press by approximately 180 degrees to change a position of a first press to a second press, and press-molding the outer powders by using the second press to integrally form the outer spline and the inner spline; raising the first mold and the second mold to the upper side to separate a double molded object obtained by integrally forming the inner spline and the outer spline from a mold; and performing a sintering process, a post-processing process and a high-frequency heating process on the double molded object.

Since the synchronizer hub for vehicles according to the present invention can be made of a material optimized depending on a required structural characteristic of the hub, it is possible to improve mechanical properties and to reduce cost.

Further, since mechanical properties of the synchronizer hub according to the present invention can be improved, it is possible to provide a design with a reduced weight.

In addition, according to the present invention, since the process of manufacturing the double molded object obtained by integrally forming the inner spline and the outer spline can be very effectively performed, it is possible to economically manufacture the synchronizer hub having light weight with ease.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
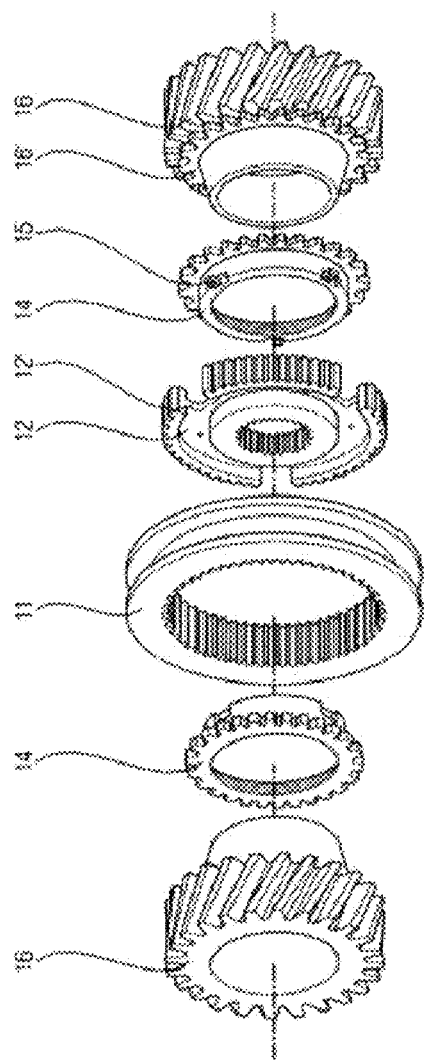
FIG. 1 is an exploded perspective view of a part to which a synchronizer hub for vehicles according to the present invention is applied.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail in connection with one implementation embodiment.

Figure 2:
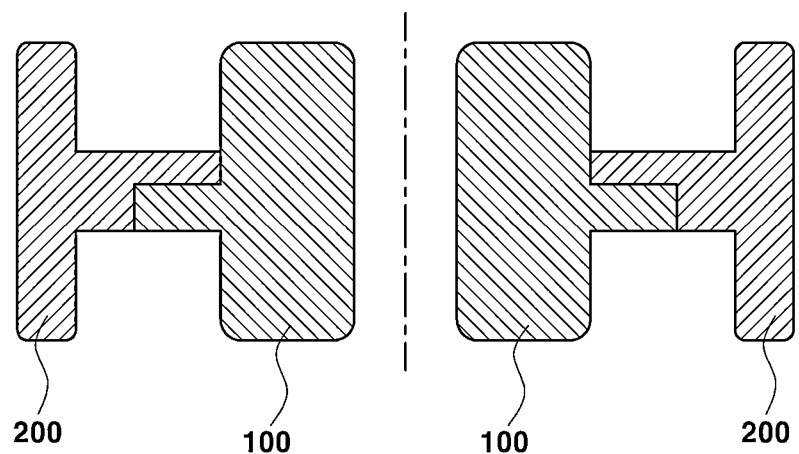
FIG. 2 is a cross-sectional view of a double molded object of the synchronizer hub according to the present invention.

The present invention relates to a synchronizer hub for vehicles which is formed as a double molded object obtained by forming an inner spline and an outer spline of a transmission synchronizer hub for vehicles by using different materials. FIG. 2 is a cross-sectional view of a double molded object of a synchronizer hub according to the present invention. In FIG. 2, reference numeral 100 denotes an inner spline, and reference numeral 200 denotes an outer spline.

According to the present invention, the inner spline may be made of 0.6 to 0.8 weight % of carbon, 0.15 to 0.30 weight % of molybdenum, 1.3 to 1.7 weight % of chromium, and a remainder of iron. Further, the outer spline may be made of 0.7 to 0.9 weight % of carbon, 0.45 to 0.60 weight % of molybdenum, 0.60 to 3.0 weight % of nickel, 1.3 to 1.7 weight % of copper, and a remainder of iron.

Accordingly, the synchronizer hub according to the present invention is formed as a double molded object obtained by forming the inner spline and the outer spline by using different materials from each other, and may be preferably formed as an integrated double molded object in which the inner spline is made of 0.6 to 0.8 weight % of carbon, 0.15 to 0.30 weight % of molybdenum, 1.3 to 1.7 weight % of chromium, and a remainder of iron, and the outer spline may be made of 0.7 to 0.9 weight % of carbon, 0.45 to 0.60 weight % of molybdenum, 0.60 to 3.0 weight % of nickel, 1.3 to 1.7 weight % of copper, and a remainder of iron.

The inner spline according to the present invention is formed through molding by using inner powders having the above-described composition, and the carbon component is a main element that is used to secure a mechanical property such as strength and facilitates a heating process. When the carbon component is too small, mechanical strength may be deteriorated, and when the carbon component is too large, impact strength may be degraded by brittleness. The molybdenum and chromium are components that are added to improve a mechanical property such as strength. When the molybdenum and chromium are too small, mechanical strength may be deteriorated, and when the molybdenum and chromium are too large, machinability may be degraded, which is undesirable.

As a material of the inner spline according to the present invention, a material that is subjected to a heating process and has a high material property after the heating process may be used. Preferably, a pre-alloy in which other metal powders are melted in iron may be used.

According to the present invention, the outer spline is formed through molding by using outer powders having the aforementioned composition, and the carbon component is a main element that is used to secure a mechanical property such as strength and facilitates a heating process. When the carbon component is too small, mechanical strength may be degraded, and when the carbon component is too large, impact strength may be degraded by brittleness. The molybdenum is a component that is added to improve a mechanical property such as strength. When the molybdenum is too small, mechanical strength is deteriorated, and when the molybdenum is too large, machinability may be degraded. Thus, this is not preferable. The nickel is a component that is used to secure tensile strength and elongation. When the nickel is too small, strength and elongation such as impact strength is degraded by brittleness, and when the nickel is too large, a property such as mechanical strength is degraded. The copper is used to secure a mechanical strength such as strength. When the copper is too small, mechanical strength is degraded, and when the copper is too large, the mechanical strength is degraded due to infiltration.

As a material of the outer spline according to the present invention, a material that is not subjected to a heating process and has a high material property before the heating process may be used, and a diffusion alloy in which other metal powders are diffused in iron may be preferably used.

The synchronizer hub formed as the double molded object according to the present invention may be preferably formed by sintering and high-frequency heating processes.

The synchronizer hub formed as the double molded object according to the present invention describes that a wear resistance of the inner spline is improved as compared to that of a conventional synchronizer hub by about 800%, and cost is further reduced as compared to that of the conventional one by about 20%.

Meanwhile, a process of manufacturing the synchronizer hub according to the present invention will be described in detail in connection with one implementation example.

Figure 3:
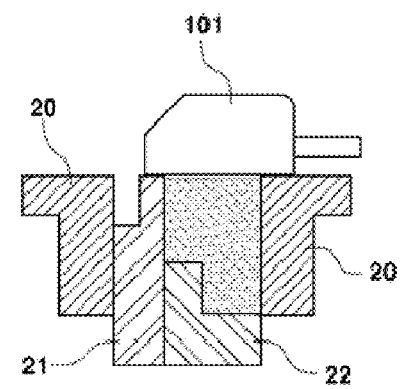
FIG. 3 illustrates schematic cross-sectional views for describing a process of molding and manufacturing the synchronizer hub according to the present invention based on steps (a) to (d)
Figure 3:
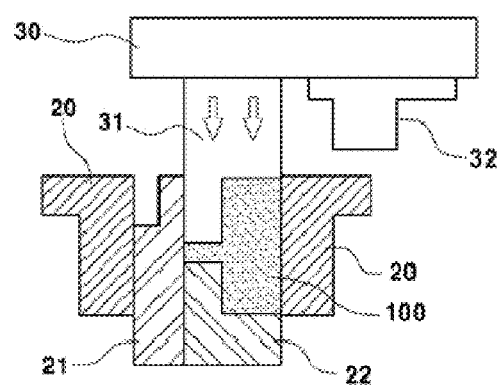
Figure 3:
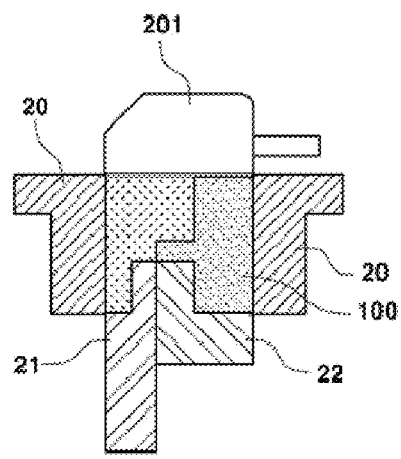
Figure 3:
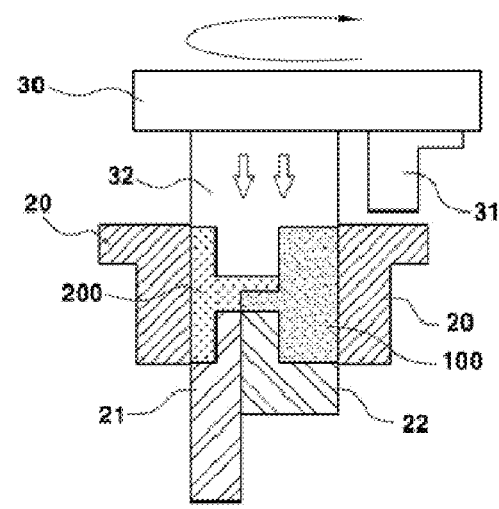
Figure 4A:
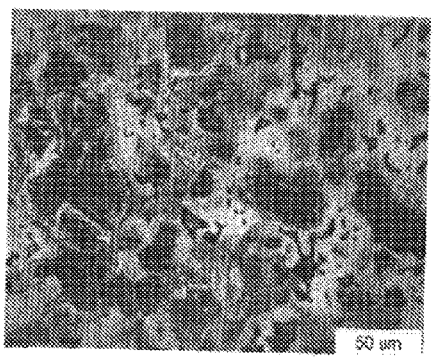
FIGS. 4(a) and 4(b) are microscope photographs for checking frictional wear amounts of an outer spline (SMF9060M) of a synchronizer hub manufactured in Example according to the present invention before and after a heating process.
Figure 4B:
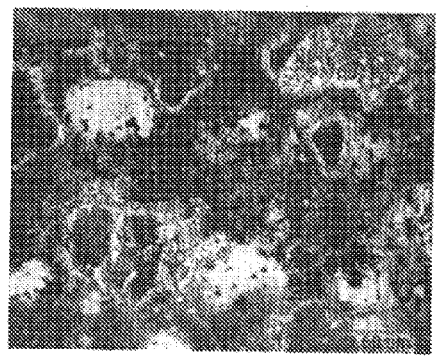
Figure 4C:
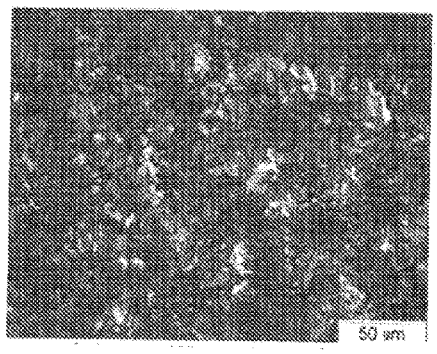
FIGS. 4(c) and 4(d) are microscope photographs for checking frictional wear amounts of an inner spline (FL5208) of the synchronizer hub before and after the heating process.
Figure 4D:
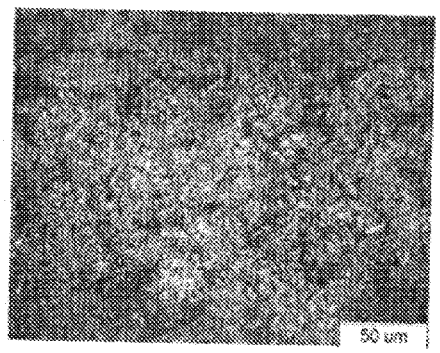

The synchronizer hub according to the present invention may be manufactured through a step of filling the inner powders for forming the inner spline, a step of molding the inner spline, a step of filling the outer powders for forming the outer spline, a step of molding the outer spline, a process of separating the double molded object obtained by integrally forming the inner spline and the outer spline from a mold, and a step of performing sintering, post-processing and high-frequency heating processes. FIG. 3 illustrates schematic cross-sectional views for describing a process of molding and manufacturing the synchronizer hub according to the present invention. FIG. 3 illustrates cross-sectional views for describing (a) a step of filling the inner powders, (b) a step of molding the inner spline by a first press, (c) a step of filling the outer powders, and (d) a step of molding the outer spline by a second press.

According to the present invention, the inner powders used for the inner spline and the outer powders used for the outer spline are respectively prepared. The inner and outer powders are prepared to have the aforementioned compositions.

According to the present invention, inner powders 101 for forming an inner spline 100 are filled in a first space formed between a mold main body 20, a first mold 21 positioned at an upper side, and a second mold 21 positioned at a lower side. In this process, the inner powders 101 having the aforementioned composition are filled using a filling shoe.

Subsequently, the inner spline is press-molded using a first press 31 in the second mold 22. In particular, the inner spline 100 is molded by pressing the filled inner powders 101 at room temperature under a pressure of 6.5 to 7.5 g/cm$^3$.

Thereafter, the first mold 21 is moved to the lower side, and outer powders 201 for forming the outer spline 200 are filled in a second space formed between the mold main body 20, the first mold 21, and the molded inner spline 100.

Subsequently, a press main body 30 is rotated by approximately 180 degrees to change a position of the first press 31 to a position of the second press 32, and then the outer spline 200 is molded using the second press 32. At this time, the outer powders are pressed at a room temperature under a press of 6.6 to 7.6 g/cm3, which is relatively greater than the pressing pressure of the inner powders. By performing this step, the double molded object obtained by integrally forming the inner spline and the outer spline is manufactured. By doing this, it is possible to manufacture the synchronizer hub for vehicles formed as the double molded object as a product having preferable mechanical properties.

Thereafter, the first mold and the second mold are raised to the upper side to separate the double molded object obtained by integrally forming the outer spline and the inner spline from a mold.

The sintering, post-processing, and high-frequency heating processes are performed on the separated double molded object, and these processes may be performed by the same methods as those used in a typical process of manufacturing the synchronizer hub.

According to the present invention, in the process of sintering the double molded object, the double molded object is sintered in a sintering furnace of, for example, about 1000 to 1300° C. under a gas mixture atmosphere of hydrogen and nitrogen for about 20 minutes to one hour. In this process, preferably, a material for forming the inner spline includes molybdenum and chromium that are easily oxidized, and, thus, the sintering process is performed under a hydrogen atmosphere.

After the sintering process, a step of cooling the molded object is typically performed to perform the post-processing process, and the cooling step may be performed by a typical method. However, it is possible to secure a mechanical property through structure control in the cooling step. Accordingly, when a cooling velocity is too fast, since volume fractions of bainite and martensite are increased, brittleness may be increased, and when the cooling velocity is too slow, since a volume fraction of pearlite is increased, strength may be decreased. In particular, after the cooling, a volume fraction of pearlite in the inner spline is preferably 80 to 89%, and a volume fraction of bainite in the inner spline is preferably 10 to 20%. A volume fraction of martensite in the outer spline is preferably 50 to 60%, and a volume fraction of pearlite in the outer spline is preferably 50 to 40%. To achieve this, the cooling velocity is preferably controlled to be 0.2 to 0.6° C./sec.

The post-processing process is precisely performed on the cooled double molded object to obtain a synchronizer hub having an appropriate shape and standard, so that a shape of the synchronizer hub is finished. The post-processing process is performed by a typical method.

A product is finished by performing the heating process on the post-processed synchronizer hub. At this time, in the heating process, for example, a high-frequency heating process is preferably performed on the boss by using a cylindrical coil. By doing this, it is possible to perform the high-frequency heating process on only the boss without hardening the entire synchronizer hub.

The synchronizer hub according to the present invention manufactured through the steps is preferably attached to a manual transmission to be applied as a product having excellent quality.

Accordingly, the present invention includes the manual transmission including the synchronizer hub according to the present invention.

According to the synchronizer hub for vehicles according to the present invention manufactured through the above-stated steps, it is possible to reduce cost, and since the synchronizer hub for vehicles has improved mechanical properties such as strength as compared to a conventional synchronizer hub and its manufacturing process is relatively simple, it is possible to economically manufacture the synchronizer hub for vehicles.

As mentioned above, since the synchronizer hub for vehicles according to the present invention has a double molded object structure and can be made of an optimized material, it is possible to improve mechanical properties and to provide a design with a reduced weight.

Hereinafter, the present invention will be described in detail in connection with examples, but is not limited to the examples.

EXAMPLES

The following examples illustrate the invention and are not intended to limit the same.

Powder materials for manufacturing the synchronizer hube are prepared as follows. Diffusion alloy powders of SMF9060M (Fe-4.0Ni-1.5Cu-0.5Mo weight %) (4,941 won/kg) are prepared as the inner powders used for the inner spline. Further, pre-alloy powders of FL5208 (Fe-1.5Cr-0.2Mo weight %) are prepared as outer powders (2,850 won/kg).

By using the manufacturing process illustrated in FIG. 3, the inner powders for forming the inner spline is filled in the first space formed between the mold main body, the first mold positioned on the upper side, and the second mold positioned on the lower side by using the filling shoe, and the inner spline is press-molded in the second mold by using the first press. At this time, the inner spline is molded by pressing the inner powders at a room temperature under a pressure of 6.9 g/cm$^3$.

Subsequently, the first mold is moved to the lower side, and the outer powders are injected into the second space formed between the mold main body, the first mold, and the molded inner spline. Thereafter, the press main body is rotated by 180 degrees, and the outer spline is molded using the second press. At this time, the outer spline is molded by pressing the outer powders at a room temperature under a pressure of 7.0 g/cm$^3$. The entire density is set to 7.0 g/cm$^3$ to manufacture the double molded object obtained by integrally forming the inner spline and the outer spline.

The first mold and the second mold are raised to the upper side to separate the double molded object from the mold, and the separated double molded object is sintered in the sintering furnace of 1140° C. under the gas mixture atmosphere of hydrogen and nitrogen in the proportion 10:90 for 30 minutes. Thereafter, the cooling is performed by controlling a cooling velocity to be 0.4° C./sec, and the double molded object in which a volume fraction of pearlite in the inner spline is 85%, a volume fraction of bainite in the inner spline is 15%, a volume fraction of martensite in the outer spline is 55%, and a volume fraction of pearlite in the outer spline is 45% is obtained.

The post-processing process is precisely performed on the cooled double molded object to obtain the shape of the synchronizer hub, and the high-frequency heating process is performed on the boss by using the cylindrical coil to manufacture the synchronizer hub for vehicles.

TEST EXAMPLES

Test Example 1

In order to evaluate a material property of the synchronizer hub manufactured in the above-described example, a mechanical property is measured, and the measured result is represented in Table 1. The measured result of the material property of the inner spline is different from the measured result of the material property of the outer spline, and there is a great difference between of wear amounts of the inner and outer splines after the heating process.

TABLE 1

| Category | Hardness (HV10) | Yield strength (Mpa) | Tensile strength (Mpa) | Impact value (J) | Frictional wear amount before heating process ($\mu m^3$) | Frictional wear amount after heating process ($\mu m^3$) |
| --- | --- | --- | --- | --- | --- | --- |
| Outer spline (SMF9060M) | 246 | 460 | 657 | 27.7 | 6881 | 6577 |

TABLE 1-continued

| Category | Hardness (HV10) | Yield strength (Mpa) | Tensile strength (Mpa) | Impact value (J) | Frictional wear amount before heating process (μm³) | Frictional wear amount after heating process (μm³) |
|---|---|---|---|---|---|---|
| Inner spline (FL5208) | 250 | 623 | 712 | 26.0 | 9080 | 869 |

Metal microstructure of the product is observed, and microstructure photographs of the inner and outer splines before and after the heating process are represented as the observed result in FIG. 4.

Referring to (a) and (b) of FIG. 4, since a Ni element in the outer spline (SMF9060M) forms a Ni-rich-Austenite region to prevent a solid solution of C, the content of C is relatively increased in a matrix, so that a martensite structure is formed even before the heating process to reduce a frictional wear amount. However, since the Ni-rich-Austenite region remains after the heating process, the volume fraction of martensite is not increased, and, thus, a frictional wear amount approximates to the frictional wear amount before the heating process.

In contrast, referring to (c) and (d) of FIG. 4, both pearlite and bainite structures of the inner spline (FL5208) are changed to martensite through the heating process, and, thus, frictional wear mounts are reduced.

Test Example 2

In order to evaluate a property of a part (a reference product of a super large size, rear-wheel drive, 6-speed, and first and second gear) of the synchronizer hub manufactured in the above-described example, a mechanical property is measured, and a result obtained by comparing the measured mechanical property with that of Conventional Example is represented in Table 2. Here, the conventional example is a synchronizer hub including only the outer spline (SMF9060M).

TABLE 2

| Category | Density (g/cm³) | Hardness of boss of inner spline (high-frequency heating process unit, HRC) | Hardness of outer spline (HV10) |
|---|---|---|---|
| Conventional Example | 7.0 | 40-41 | 252 (248 nal Ex |
| Example | 7.0 | 47-48 | 263 (261-275) |

Further, fracture and torsion (fatigue) tests for the part are performed under the following conditions.

[Fracture Test]

It is checked whether or not fracture is caused in 450 Nm (equipment maximum limit, required torque×1.2), and the condition is a strain rate of 0.05 deg/sec.

[Torsion Test]

Condition 1: torque—322 to 3220 Nm (required torque× 1.5), torque ratio (τmax/τmin)—10, evaluation speed—10 Hz, cycle—200,000 times Condition 2: torque n speed—10 Hz, cycle—200,000 t×1.85), torque ratio (τmax/τmin)), torque ratio (speed—10 Hz, cycle—200,000 times As the test results, the fracture test result is represented in Table 3.

TABLE 3

| Category | Slope (Nm/Degree) | Test result |
|---|---|---|
| Conventional Example | 5441.6 | OK (no damage) |
| Example | 5587.6 | OK (no damage) |

Furthermore, the torsion test result is represented in Table 4.

TABLE 4

| Category | Test mode | | Test torque (Nm) | Target Cycles | Test result |
|---|---|---|---|---|---|
| Conventional Example | Condition 1 | Required torque × 1.5 | 322 to 3220 | 200,000 | OK (no damage) |
| | Condition 2 | Required torque × 1.85 | 400 to 4000 | 500,000 | OK (no damage) |
| Example | Condition 1 | Required torque × 1.5 | 322 to 3220 | 200,000 | OK (no damage) |
| | Condition 2 | Required torque × 1.85 | 400 to 4000 | 500,000 | OK (no damage) |

As the test results, it can be seen that even though the synchronizer hub is formed as the double molded object, the synchronizer hub has an excellent mechanical property, the synchronizer hub is very suitable to be applied to an actual product. Particularly, it can be seen that the product (Example) according to the present invention has remarkably an excellent mechanical property in comparison to the existing product (Conventional Example).

Since the synchronizer hub for vehicles according to the present invention is formed as the double molded object, it is possible to improve mechanical properties, to reduce the cost, and to decrease weight.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A synchronizer hub for vehicles, comprising:
   the synchronizer hub being formed as a double molded object obtained by integrally forming an inner spline and an outer spline of the synchronizer hub by using different materials,
   wherein a volume fraction of pearlite in the inner spline is 80 to 89%, a volume fraction of bainite in the inner spline is 10 to 20%, a volume fraction of martensite in the outer spline is 50 to 60%, and a volume fraction of pearlite in the outer spline is 50 to 40%.

2. The synchronizer hub for vehicles of claim 1, wherein the inner spline is made of 0.6 to 0.8 weight % of carbon, 0.15 to 0.30 weight % of molybdenum, 1.3 to 1.7 weight % of chromium, and a remainder of iron.

3. The synchronizer hub for vehicles of claim 1, wherein the outer spline is made of 0.7 to 0.9 weight % of carbon, 0.45 to 0.60 weight % of molybdenum, 0.60 to 3.0 weight % of nickel, 1.3 to 1.7 weight % of copper, and a remainder of iron.

4. The synchronizer hub for vehicles of claim 1, wherein the inner spline is made of a pre-alloy in which other metal powders are melted in iron.

5. The synchronizer hub for vehicles of claim 1, wherein the outer spline is made of a diffusion alloy in which other metal powders are diffused in iron.

* * * * *